UNITED STATES PATENT OFFICE.

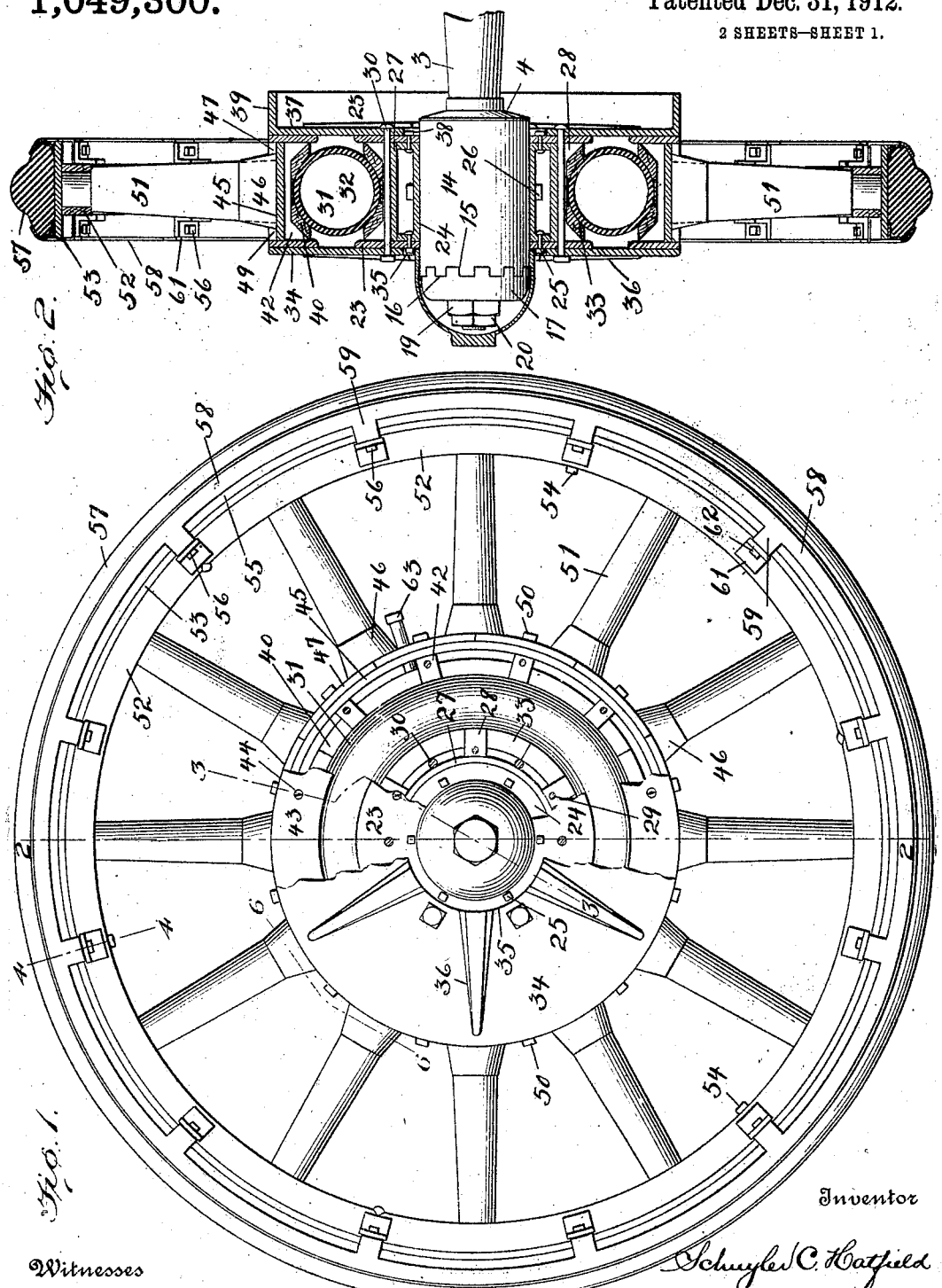

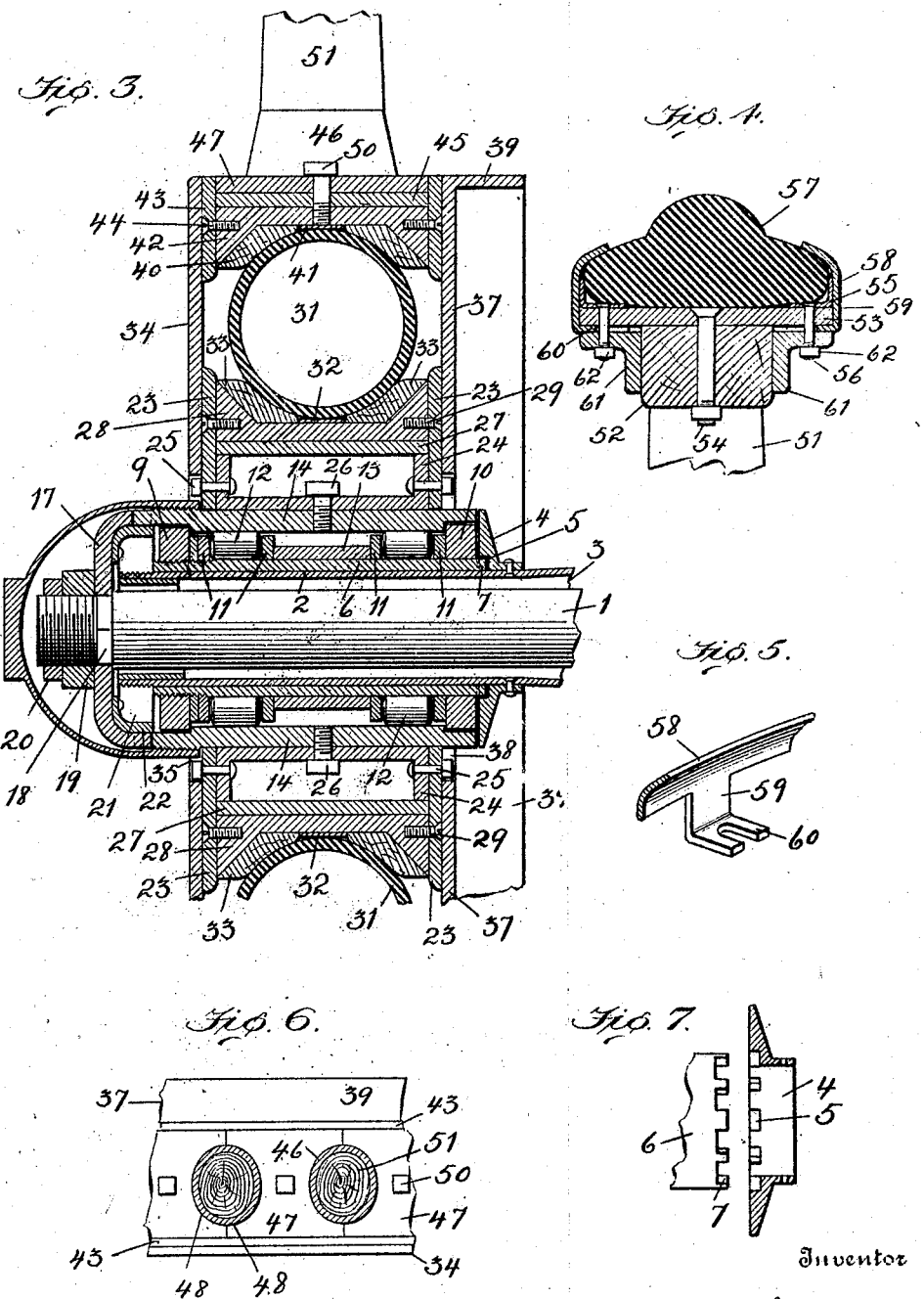

SCHUYLER C. HATFIELD, OF BALTIMORE, MARYLAND, ASSIGNOR OF ONE-HALF TO GEORGE W. SMITH, OF BALTIMORE, MARYLAND.

VEHICLE-WHEEL.

1,049,300.  Specification of Letters Patent.  Patented Dec. 31, 1912.

Application filed April 20, 1911. Serial No. 622,206.

*To all whom it may concern:*

Be it known that I, SCHUYLER C. HATFIELD, a citizen of the United States, residing at Baltimore, in the State of Maryland, have invented certain new and useful Improvements in Vehicle-Wheels, of which the following is a specification.

This invention relates to improvements in vehicle wheels and particularly to that class of wheels having rubber tires with a cushioning means interposed between the tire and the hub.

The object of the invention is to provide an improved construction of pneumatic cushioning means about the hub of a wheel to absorb the shocks produced at the rim or tire and to protect the said pneumatic means against damage that so often results where the cushion is at the rim.

The accompanying drawings illustrate the invention wherein—

Figure 1, is a side elevation of a wheel constructed in accordance with the invention with parts broken away about the hub to show the construction thereof. Fig. 2, is a vertical sectional elevation of the wheel,— the section being taken on the line 2—2 of Fig. 1. Fig. 3, is an enlarged sectional detail through the hub and the wheel parts about the same—this section being taken on the line 3—3 of Fig. 1. Fig. 4, is a cross-sectional detail through the tire proper and the parts for securing the same in place;— the section being taken on the line 4—4 of Fig. 1. Fig. 5, shows a portion of the tire engaging ring in perspective. Fig. 6 is a sectional plan view of the spoke sockets and the plates for holding the same in place, and Fig. 7, is a detail of the inner hub collar and the inner end of the stationary bearing sleeve which engages the collar.

Referring to the drawings by numerals, 1, designates the axle shaft and, 2, the sleeve portion at the outer end of the casing, 3, that incloses the axle shaft which is well known in the art. The sleeve, 2, carries a rigid collar, 4, at the inner side of the wheel which collar is provided with a series of sockets, 5, and a bearing sleeve, 6, slips over the outer end of the sleeve, 2, and has a plurality of projecting lugs, 7, at its inner end which enter the sockets, 5, in the collar and thus lock the bearing sleeve against rotation. A reinforce collar, 8, is provided on the interior and at the end of the sleeve, 2, whereby to resist strains that would tend to crush said sleeve end. Collars, 9, and, 10, respectively are provided at opposite ends of the bearing sleeve, 6, and between said collars and also encircling the bearing sleeve are a plurality of bearing collars, 11, which are so spaced as to form annular channels for the reception of suitable rollers, 12. A spacing collar, 13, also encircling the bearing sleeve, 6, serves to separate the two inner bearing collars, 11.

The hub proper comprises an annular shell, 14, which encircles the rollers, 12, and also the collars, 9, and, 10, and has its inner end confronting the rigid collar, 4, on the casing while its outer end has a series of edge notches, 15, which intermesh with like edge notches, 16, in a coupling member, 17. This coupling member has the form of a cap and fits over the outer end of the axle shaft, 1, with which it is rigidly secured by means of a squared or angular portion, 18, on the axle and a like-shaped opening in the cap. Nuts, 19, and, 20, also lock the cap coupling in place on the end of the axle shaft. A cup-shaped washer plate, 21, is placed on the inside of the cap coupling and has its flenge portion, 22, projecting over the engaged edge notches, 15, and, 16.

Two spaced-apart ring plates, 23, encircle the annular shell, 14, of the hub proper and are held in spaced-apart position by means of a circular channel plate, 24,—the two being rigidly connected by means of suitable bolts, 25. By referring particularly to Fig. 3 of the drawings it will be seen that the channel plate, 24, is rigidly secured to the annular shell, 14, of the hub by means of bolts, 26, and consequently must turn therewith. It will also be seen by reference to said Fig. 3, that the ring plates, 23, are of a considerably greater diameter than the spacing channel plate and project beyond a circular shell, 27, that encircles and rests upon the flanges of the channel plate, 24. A plurality of spacer blocks, 28, are provided at intervals about the circular shell, 27, which blocks extend crosswise of the shell and serve to trace the outer rim portions of the ring plates, 23,—the blocks being secured at opposite ends to the ring plates by means of suitable screws, 29. Bolts, 30, also extend through the ring plates, 23, and across the outer surface of the shell, 27, whereby to tie the ring plates together at intervals between adjacent spacer blocks.

In carrying out my invention I locate the pneumatic cushion about the outer side of the spacer blocks, 28, and the bolts, 30, and in order to provide a suitable bearing surface or support for said cushion, which has the form of a pneumatic tube, 31, I interpose a central bearing ring, 32, between the inner circumference of the said tube and the blocks and bolts. This bearing ring, 32, is preferably metal and has position between two non-metallic ring plates, 33, whose outer surfaces are concaved so as to form an annular channel with the metal bearing ring, in which the inner circumference of the pneumatic tube may seat. It will thus be understood that the non-metallic ring plates, 33, have position between the side ring plates, 23.

At the outer side the wheel has a flat cover plate, 34, with a central circular opening, 35, through which the outer end of the hub and the coupling member project, and for purposes of strengthening the plate the same is provided with a plurality of ribs, 36, which radiate from the central opening. The inner side of the wheel also has a cover plate, 37, and this latter plate has a central opening, 38, so that it may encircle the inner end of the hub. This inner plate may be provided with a laterally-extending circumferential flange, 39, that may be utilized as a drum for a brake band, but it is obvious that if the wheel is not a driving wheel the flange would be omitted.

By reference to Figs. 1 and 2 it will be noted that the bolts, 30, that extend through the ring plates, 23, also project through suitable perforations in the outer and inner cover plates, 34, and, 37, and thus hold the latter clamped against the sides of the ring plates, 23, At the outer side of the pneumatic tube I provide another pair of non-metallic ring plates, 40, with a metallic bearing ring, 41, between the two so as to form a channel for the outer side of the tube to bear against and said plates are sustained from spacer blocks, 42, that are interposed between two side ring plates, 43, to which they are secured by suitable screws, 44. A continuous metal ring, 45, extends around the spacer blocks, 42, and between the ring plates, 43, and said metal ring forms a support for the inner ends of tapered spoke sockets, 46, as clearly seen in Fig. 2. The spoke sockets, 46, have enlarged inner ends and smaller outer ends and it is the enlarged ends that seat against the ring, 45. In order to secure these sockets in place and prevent them from shifting laterally on the ring, 45, I provide a series of clamping plates, 47, which are interposed between adjacent sockets, and which have a semi-circular notch, 48, in each end that snugly fits around and receives one half of the socket at the side of it. The walls, 49, of these clamping plates are beveled to conform to the taper of the sockets so that when the ends of two of the clamping plates engage the same socket they will entirely encircle the larger end thereof and prevent the latter from withdrawing therefrom. Suitable bolts, 50, pass through each clamping plate and also through the ring, 45, and screw into the spacer blocks, 42, whereby to hold the clamping plates in rigid position about the sockets.

It is to be understood that there is no connection between the parts about the outer side of the tube, 31, and the outer or inner cover plates, 34, and, 37, and that said parts have a sliding movement between said two cover plates.

The spokes, 51, have their inner ends seated in and secured to the sockets, 46, and their outer ends are suitably secured in a rim, 52. A metal tire plate, 53, encircles the rim and is secured thereto by means of bolts, 54, and said plate is wider than and projects over the opposite side edges of the rim, as clearly seen in Fig. 4. An angle plate, 55, is provided on the outer and opposite edges of the tire plate and is held thereon by means of bolts, 56, that pass therethrough and also through the tire plate. The tire proper, 57, is preferably of solid rubber and encircles the plate, 55, and the opposite side edges thereof are seated against the angle plates, 55, which receive the lateral strains that are put upon the tire. To hold the outer rubber tire against the inner metal tire I provide curved side plates, 58, which extend over the outer surface and at opposite sides of the tire and said plates are provided with arms, 59, at intervals which arms have inturned slotted extensions, 60, that project over the inner face of the metal tire and the slots of which permit the bolts, 56, to pass therethrough. An angle plate, 61, is provided at the side of the rim and has one face seated against the slotted extension, 60, of the arm, 59, so that the threaded end of the bolt, 56, may be passed through a perforation in the angle plate. A nut, 62, on the bolt, 56, draws the angle plate close against the extension, 60, and clamps the same against the metal tire plate, 53, thus holding the side plates, 58, in position.

By means of the construction above described the weight placed on the outer tire, 57, will be transferred through the spokes, 51, to the ring, 45, and from the latter through spacer-blocks, 42, to plates, 40. The plates, 40, will then deliver the weight onto the pneumatic tube, 31, on which it will be distributed throughout its entire circular area because the compression of the tube at one point will cause a slight inflation at all other points and thus the strain will not be all applied to any particular point of the tube.

Inflation of the tube, 31, is accomplished through nipple connection, 63, as shown in Fig. 1.

Having thus described my invention what I claim and desire to secure by Letters Patent is,—

1. A vehicle wheel having a hub portion with an inner channeled bearing encircling the hub; means for rigidly connecting the channeled bearing and hub; a cover plate at each side of the channeled bearing; two ring plates at the inner side of each cover plate one ring plate being larger than and encircling the other ring plate and each smaller ring plate being secured to the inner channeled bearing; an outer channeled bearing carried by the larger of the said two ring plates; a pneumatic tube between said channeled bearings; spokes radiating from the outer channeled bearing; a rim at the outer ends of the spokes and a tire about the rim.

2. A vehicle wheel having a hub portion with two annular spaced-apart cover plates encircling the hub; bolts rigidly connecting the said two cover plates; two ring plates of different diameters at the inner side of each cover plate and the larger ring plate at each side encircling the smaller ring plate; an inner channeled bearing secured to and carried between the two smaller ring plates; an outer channeled bearing secured to and carried between the two larger ring plates; a pneumatic tube seated in the two channeled bearings; a continuous metal plate encircling the outer channeled bearing and also located between the two larger ring plates; spokes radiating from the continuous metal plate; a rim at the outer ends of the spokes and a tire about said rim.

3. A vehicle wheel having a hub portion and an inner channeled bearing extending around and rigidly connected to the hub; a cover plate at each side of the inner channeled bearing and of a greater diameter than the latter, a pneumatic tube encircling the inner channeled bearing; a movable ring plate at the side of each cover plate, a metal band encircling the outer channeled bearing; tapered spoke sockets seated against said metal band; clamp plates also seated against the metal band and having semi-circular notches in its ends to engage the tapered spoke sockets; means for securing the clamp plates to the metal band; spokes radiating from the sockets; a rim at the outer ends of the spokes and a tire about the rim.

In testimony whereof I affix my signature in presence of two witnesses.

SCHUYLER C. HATFIELD.

Witnesses:
 CHARLES B. MANN, Jr.,
 G. FERD. VOGT.